United States Patent Office.

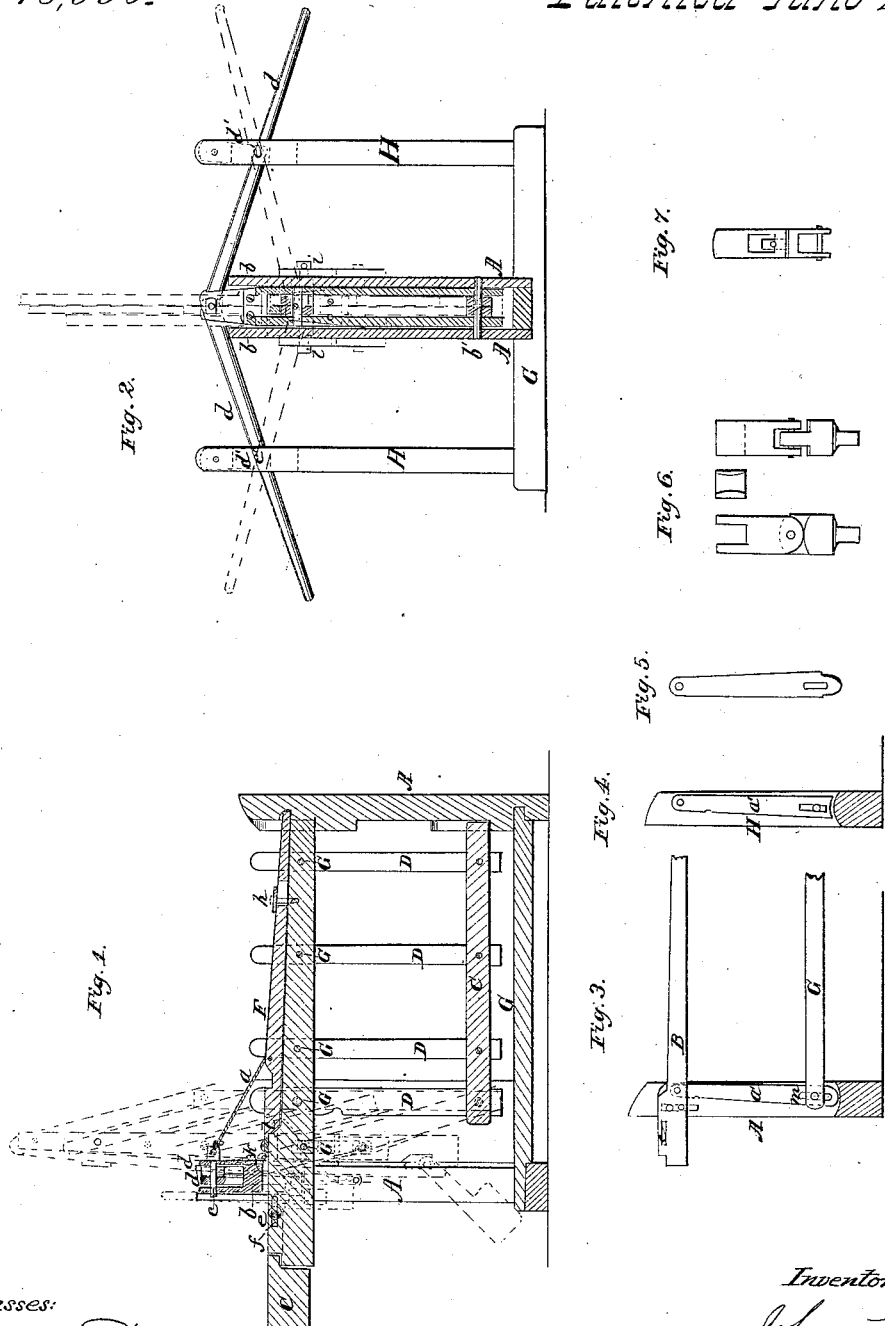

JOHN LEE, OF MASSILLON, OHIO.

Letters Patent No. 78,598, dated June 2, 1868; antedated May 27, 1868.

---

IMPROVEMENT IN GATES.

---

The Schedule referred to in these Letters Patent and making part of the same.

---

TO ALL WHOM IT MAY CONCERN:

Be it known that I, JOHN LEE, of Massillon, in the county of Stark, and in the State of Ohio, have invented certain new and useful "Improvements in Carriage-Gates;" and I do hereby declare that the following is a full, clear, and exact description thereof, reference being had to the accompanying drawings, making a part of this, a complete specification.

The nature of my improvements is for the purposes more fully hereinafter set forth; the principal object being to open a road-gate without the necessity of getting down from a vehicle or off horseback.

Figure 1 is a side view of the gate closed, and the red lines show the gate elevated or open.

Figure 2 is an end view of the gate when closed, the red lines showing the gate raised.

Figure 3 is a vertical section, with the slat or bars left off, showing the upper and lower portions of the gate, and the upright-lever bar.

Figure 4 is a vertical section through to post, into which the gate fastens, showing the levers to which the bars of the gate (the top and bottom bar) are attached, and are curved at the lower end, while the post on which they rest is concave, the same as in fig. 3.

Figure 5, the bars in detail, the same as in figs. 3 and 4.

Figure 6, another means or form of the lever to operate the gate, attached to the hand-lever on either side of the gate, for opening and closing the same.

Figure 7 is a toggle-joint fulcrum, to which I may attach the hand-lever, and which will allow for any variation in operating said lever from a direct vertical line.

To enable others skilled in the art to make and use my invention, I will proceed to describe its construction and operation.

In the construction of my gate, in fig. 1, A A' are the posts to which the gate is fastened, and on one of which it swings, and to which it is permanently attached by upright bars $a'$ $a'$, as seen in figs. 3 and 4, and the bolts $b'$ and $i$ in fig. 2. B, the upper gate-bar, to which, at the rear end, is attached the sliding block or weight E, attached to it by the bolt $f$, and working in a slot, $e$, that the weight, on striking the ground or any obstruction, as snow around the post, may readily slip up and turn out of the way, and let the gate be raised in a vertical line. F is the sliding latch, to fasten the gate when let down into the post A', and to keep it from being opened by cattle or hogs. This latch has a bolt through it at $h$, working in a slot, to allow it to slide back or forward. At the rear end it fits to an inclined plane on the bar B.

$a$ is a cord attached to this latch, and also is attached to the bolt connecting the levers $d$ $d$, to draw back the latch out of its hold in A' post. D D D are the upright bars of the gate, and are fastened to the bars B and G by screws or bolts, on which they are allowed to turn readily. G, the bottom piece of the frame, attached to posts A and A'. $i$ is the bolt on which the gate hangs, and works in a slot, $g'$, in fig. 1. In the detached parts, 3 and 4, the levers $a'$ are allowed to rest also on the lower part of the post, and at their lower end are made convex or concave, while the part of the post on which they rest is the reverse concave or convex, so that the weight of the gate is thus relieved from the bolts, and rests on the post itself. The red lines represent the gate elevated. In fig. 2 the same parts are designated by the same letters, as in fig. 1.

H H, the posts on which levers $d$ and $d$ are attached by means of the movable fulcrum $d'$ $d'$, as seen in dotted lines, fig. 2, secured to the said posts by bolt $c'$. The inner ends of said levers are joined to the hinged fulcrum $b$ by a hinge, $k$, fig. 1.

In fig. 7 is shown a toggle-joint, to be used for the fulcrum of levers $d$ at posts H H.

Fig. 6 shows a detached model, that may be used instead of the weight E, and may be similarly attached to the bar B.

In the operation of my invention, the person, either on horseback or in a carriage, drives his horse close to the gate, then applies his hand to lever $d$ on either side, and raises it up, which causes fulcrum $b$ to press hard on the bar B, and as the block $b$ assumes a vertical position, it draws string or cord $a$, which draws back catch F, which unlocks the gate, and, continuing to raise lever $d$, the gate is thrown up into a vertical position, as seen in red lines in both figs. 1 and 2, causing the bolt $i$ to slide down in the slot $g'$ in the post A, and the levers $a'$ will rest on the post, as seen in fig. 3. When the gate is passed, he then presses on lever $d$, on the opposite side of the gate, and the gate is readily thrown down, and is caused to lock itself by means of the inclined plane $l$, thus, without dismounting, opening and closing the gate with but slight inconvenience to the traveller to and fro.

Having thus fully described the construction and operation of my invention, what I claim as new, and desire to secure by Letters Patent, is—

1. The blocks or revolving fulcra $d'\ d'$, and hinged fulcrum $b$, attached to top rail B of gate, and the hand-levers $d\ d$, when used in combination with the same, constructed and operating as described, and for the purposes set forth.

2. The sliding latch F and inclined plane $l$, and rope $a$, for locking and unlocking the gate, constructed as described, and operating as set forth.

3. The weight-box attached to rail B, and operating in slot $f$, on pivot-bolt $e$, constructed as described, and operating as set forth.

4. The sliding pivot and guide-blocks $i\ i$, for keeping the gate in a vertical line while being operated, constructed as described, and for the purposes set forth.

5. The levers $a'\ a'$, with slots $m$, and concave or convex ends, and convex or concave in post A, to correspond, constructed and operating as described, and for the purposes set forth.

In testimony that I claim the above-described invention, I have hereunto signed my name, this    day of    , 1866.

JOHN LEE.

Witnesses:
   V. C. CLAYTON,
   G. J. ELLIS.